United States Patent [19]

Arima et al.

[11] Patent Number: 4,976,069
[45] Date of Patent: Dec. 11, 1990

[54] AUTOMOBILE DOOR SEAL, AND A MOLDING APPARATUS THEREOF

[75] Inventors: Hidetoshi Arima, Kyowamachi; Satoyuki Hatayama, Aichi, both of Japan

[73] Assignee: Tokai Kogyo Kabushiki Kaisha, Oobu, Japan

[21] Appl. No.: 429,361

[22] Filed: Oct. 31, 1989

[30] Foreign Application Priority Data

Nov. 2, 1988 [JP] Japan .................................. 63-278417
Apr. 7, 1989 [JP] Japan ..................................... 1-89450

[51] Int. Cl.⁵ .............................................. E06B 7/16
[52] U.S. Cl. ......................................... 49/497; 49/479; 49/491
[58] Field of Search ................. 49/497, 479, 490, 491; 428/122

[56] References Cited

U.S. PATENT DOCUMENTS

| | | | |
|---|---|---|---|
| 4,042,741 | 8/1977 | Bright | 49/497 X |
| 4,277,099 | 7/1981 | Klein et al. | 49/490 X |
| 4,513,044 | 4/1985 | Shigeki et al. | 49/490 X |
| 4,531,326 | 7/1985 | Ballocca et al. | |
| 4,576,773 | 3/1986 | Azzola et al. | |
| 4,584,150 | 4/1986 | Ballocca | |
| 4,619,077 | 10/1986 | Azzola et al. | |
| 4,769,947 | 9/1988 | Ogawa et al. | 49/479 |

*Primary Examiner*—Philip C. Kannan
*Attorney, Agent, or Firm*—Wenderoth, Lind, & Ponack

[57] ABSTRACT

An automobile door seal, which consists of an anchor portion to be attached to the frame of the sutomobile body and a tubular seal portion integrally connected with the anchor portion and achieving sealing by elastic deformation, the seal being capable of being attached along the peripheral edge of a door opening of the automobile body, seal having a first door-sealing portion having therealong an insertion groove extending in the direction of the length of the door seal and adjacent the integral connection of the anchor portion and the tubular seal portion and being for receiving the edge of a facing member on the interior of the automobile body, and the door seal having a second door-sealing portion which is ungrooved, the door sealing portions being integrally molded to each other for avoiding the presence of a joint between them.

4 Claims, 7 Drawing Sheets

AUTOMOBILE DOOR SEAL, AND A MOLDING APPARATUS THEREOF

FIELD OF THE INVENTION

The present invention relates to a door seal to be attached along the peripheral edge of a door opening of the body of an automobile in order to seal the contact portion between the door and the peripheral edge of the door opening of the car body when the door has been closed, and it also relates to a molding apparatus thereof.

PRIOR ART

The conventional door seal 52 attached along the peripheral edge of a door opening of an automobile is composed of a first door sealing members 52a and a second door sealing member 52b integrally joined through the joints 54, as shown in FIGS. 16 to 18. The door seal 52 consists of an anchor portion 56 to be fitted to a flange protruding from the inside of the door frame (not illustrated) of the car body and an elastically deformable tubular seal portion 58 for achieving sealing, which has been molded together (unified) with the anchor portion 56.

Along the peripheral edges of the lower-half door opening and the upper-half door opening of the car body, the first door-sealing members 52a and the second door-sealing member 52b are respectively attached.

The first door-sealing members 52a are attached combined with a facing or finishing panel member (not illustrated) for lining the car interior for the sake of decoration, and its anchor portion 56 has an insertion groove 60 for receiving the edge of the facing member. However, the anchor portion of the second door-sealing member 52b does not have such an insertion groove 60.

The first door-sealing members 52a and the second door-sealing member 52b are joined through the joints 54 by mold joining.

Because the door seal 52 is partially combined with a garnish member when it is attached along the peripheral edge of a door opening of the car body, it has such a structure that two kinds of the first and second door-sealing members 52a and 52b different in cross-sectional shape have been integrally joined.

To prepare the conventional door seal 52, the first door-sealing members 52a having the insertion groove 60 in the anchor portion 56, and the second door-sealing member 52b having no groove in the anchor portion 56 are molded separately using two different molding dies, and the first and second door-sealing members 52a and 52b are joined through the joints 54 by mold joining.

Therefore, in terms of a molding device, the cost becomes high because two molding dies different in structure and a mold for mold joining are required. In terms of a molding method, since two kinds of the first and second door-sealing members 52a and 52b molded separately must be joined by mold joining, manhours for processing (making) increase to raise the cost of products. Furthermore, in terms of a door seal structure, after the door seal has been attached to the automobile, the joints 54 between the door-sealing members 52a and 52b are exposed, and the delicate difference in hue between the joints 54 and the other portions impairs the appearance.

SUMMARY OF THE INVENTION

The automobile door seal of the present invention to be attached along the peripheral edge of a door opening of the car body has an anchor portion to be attached to the frame of the car body and a tubular seal portion elastically deformable unified with the anchor portion and to achieve sealing. It is characterized by such a structure that a first door-sealing member attached along the peripheral edges of the door opening of the car body and having the anchor portion in which an insertion groove is formed in the direction of length in order to receive the edge of the facing member and a second door-sealing member not having such a groove in the anchor portion are molded together without any joint.

Moreover, the molding apparatus of the present invention for preparing such an automobile door seal is characterized in that a basic molding die with an extrusion opening for extruding both the anchor portion and the tubular sealing portion of the door seal is fitted on the tip of an extrusion head, and that a groove forming tool for forming the insertion groove partially in the anchor portion extruded from the basic molding die is mounted on the front end of the basic molding die movably in the direction orthogonal to the direction of the door seal extrusion.

Since the door seal of the present invention is molded together without any joint, it has a hue of the same material over the entire length, and in the event that it is attached along the peripheral edge of a door opening of the car body, the appearance is not impaired because unlike the conventional door seal there is no joint. Besides, unlike the conventional door seal, because there is no need to join two kinds of door-sealing members different in the cross-sectional shape, using a mold, the manhours for processing (making) can be greatly decreased, thus leading to the cost reduction.

In addition, in terms of the molding apparatus, since a groove forming tool capable of moving in the direction orthogonal to the direction of the door seal extrusion is mounted on the front end of the basic molding die, the first and second door-sealing members different in the cross-sectional shape can be continuously molded using one basic molding die. Therefore, the preparatory work for molding can be halved, to enhance the productivity, and the fabrication cost of the molding die is also halved.

Besides, the other objects and benefits of the present invention will be sufficiently understood through the following description.

BRIEF DESCRIPTION OF THE DRAWINGS

FIG. 1 is a perspective view showing an automotive door seal 2 of the present invention.

FIG. 2 is a front view of the door seal 2 bent in the form of the peripheral edge of a door opening.

FIGS. 3 and 4 are respectively enlarged cross-sectional views taken along the lines X1—X1 and X2—X2 of FIG. 2.

FIG. 5 is a side view showing an automobile.

FIGS. 6 and 7 are respectively enlarged cross-sectional views taken along the lines Y1—Y1 and Y2—Y2 of FIG. 5.

FIG. 8 is a perspective view showing the door seal molding apparatus of the present invention.

FIGS. 9 and 10 are front views of the molding apparatus respectively under the state that the first door-sealing member 2a and the second door-sealing member 2b are being molded thereby.

FIG. 11 is a cross-sectional view taken along the line Z—Z of FIG. 9.

FIG. 12 is a front view showing the portion of the extrusion opening 28 of the molding die 24.

FIG. 13 is a plan view showing the door seal 2 prepared continuously by extrusion molding.

FIGS. 14 and 15 are respectively perspective views of another automobile door seals 2' and 2" of the present invention.

FIG. 16 is a front view of the conventional door seal 52 having the first door-sealing members 52a and the second door-sealing member 52b joined through the joints 54 and bent in the form of the peripheral edge of a door opening.

FIGS. 17 and 18 are respectively enlarged cross-sectional views taken along the lines W1—W1 and W2—W2 of FIG. 16.

EXAMPLE

Figure 5:
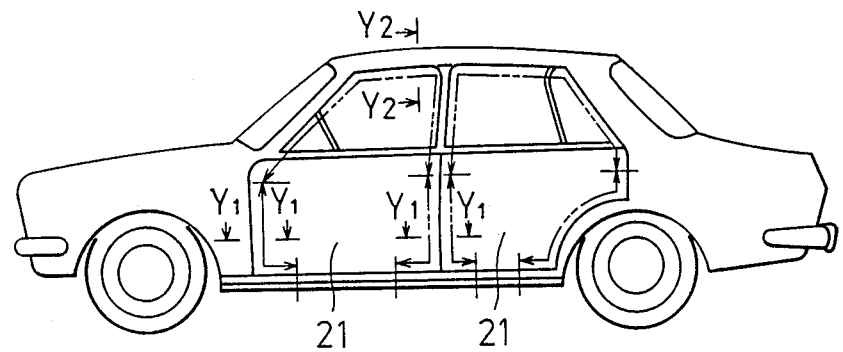
Figure 6:
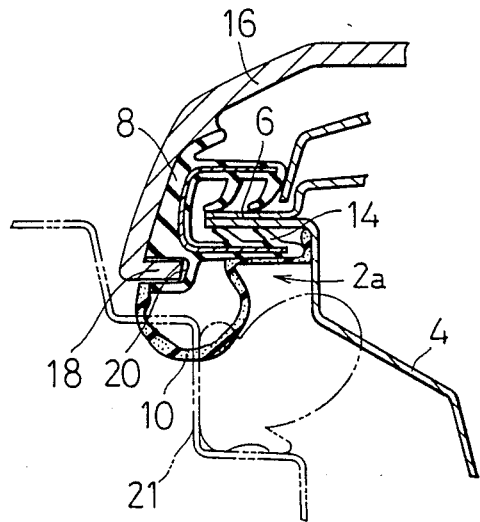
Figure 7:
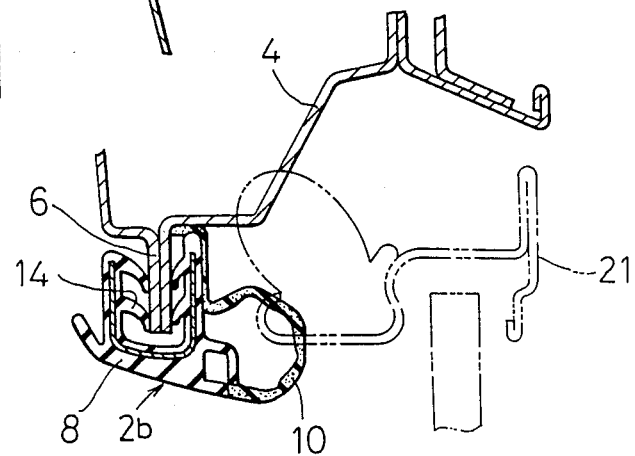
Figure 8:
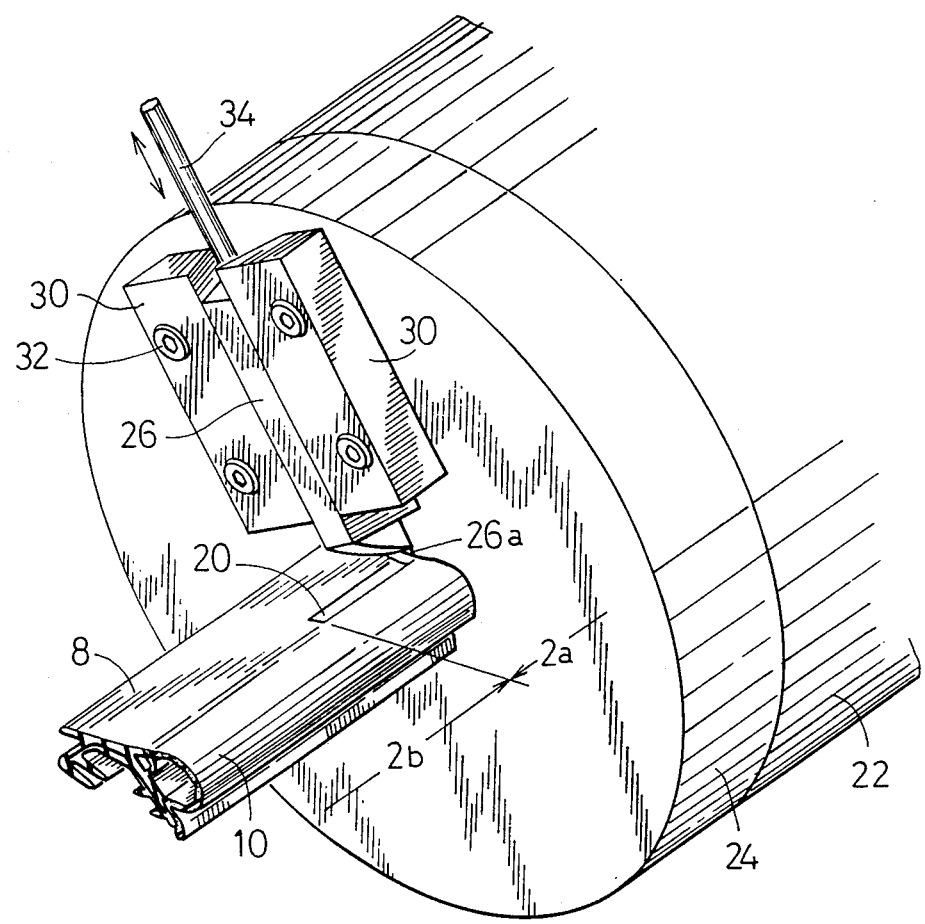

FIGS. 1 to 4 show a door seal 2 of the present invention, and FIGS. 5 to 7 show the state where the door seal has been attached along the peripheral edge of a door opening of the body of an automobile.

The door seal 2 consists of a U-shaped anchor portion 8 to be fitted to a flange protruding from the inside of a door frame 4 of the car body (see FIGS. 6 and 7), and an elastically deformable tubular sealing poriton 10 for achieving sealing molded integrally with the anchor portion 8. The anchor portion 8 contains a core bar 12 for holding its form, and has several fitting lips 14 erected on the inside surface.

The door seal 2 of the present invention has the first door-sealing member 2a and the second door-sealing member 2b different in the cross-sectional shape and molded together without any joint.

The anchor portion 8 of the first door-sealing member 2a has an insertion groove 20 in the direction of length in order to receive the end 18 of a facing member 16 for lining the car interior for the sake of decoration (see FIG. 6). On the other hand, the anchor portion 8 of the second door-sealing member 2b does not have such an insertion groove 20. Namely, the anchor portion 8 of the second door-sealing member 2b has its opening corresponding to the insertion groove 20 of the anchor portion 8 of the first door-sealing member 2a closed, and it is kept hollow.

Figure 1:
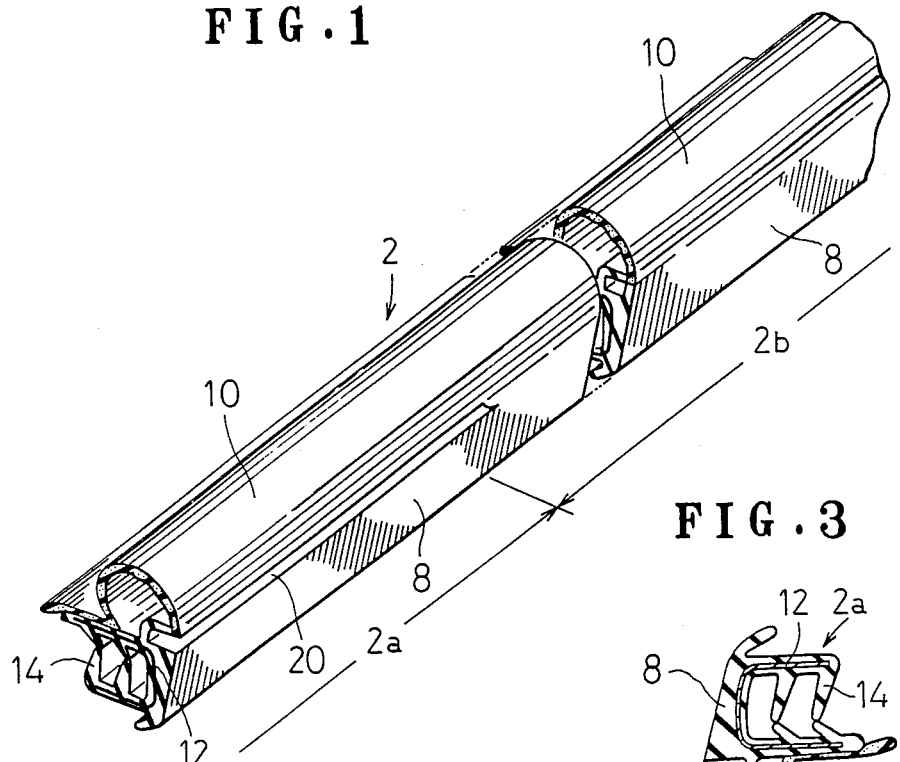
FIGS. 1 to 15 are drawings for illustrating the present invention.
Figure 3:
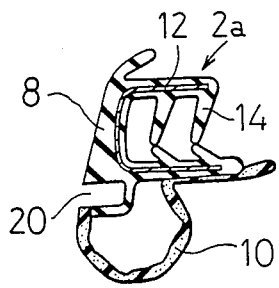
Figure 2:
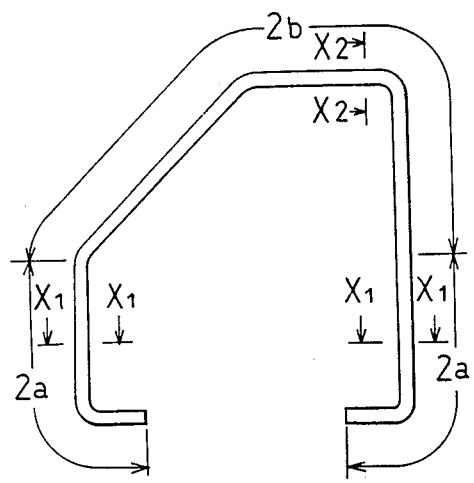
Figure 4:
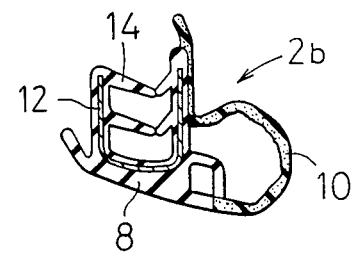

The first door-sealing member 2a combined with the facing member 16 is attached along the lower-half door opening (the portion shown by a one-dot-dash line in FIG. 5) of the automobile, and the second door-sealing member 2b is attached along the upper-half door opening (the portion shown by a two-dot-dash line in FIG. 5). Therefore, the form of the door seal which is to be attached to a front door opening before being attached is as shown in FIG. 2.

As shown in FIGS. 5 to 7, both the anchor portions 8 of the first and second door-sealing members 2a and 2b are fitted to the flange of the door frame 4 of the car body, and the end 18 of the facing member 16 is inserted into the insertion groove 20 formed in the anchor portion 8 of the first door-sealing member 2a.

When the door seal 2 of the present invention is attached along the peripheral edge of a door opening of the car body, the whole shows the same hue because two kinds of the first and second door-sealing members 2a and 2b different in the cross-sectional shape are molded together, and it does not happen that, as with conventional door seal with joints, the joints and the other portions delicately differ in hue, to make the joints conspicuous, thus impairing the appearance.

In FIGS. 5 to 7, symbol 21 denotes a door of the automobile.

FIGS. 8 to 12 show a molding apparatus for preparing the integrally molded door seal 2 by extrusion molding. Although the cross-sectional shape of the door seal 2 immediately after extrusion molding is different from the cross-sectional shape of the door seal 2 to be attached along the peripheral edge of a door opening, the same symbol is in use for illustration.

On the tip of an extrusion head 22, a basic molding die 24 is mounted, and on the front end of the basic molding die 24, a groove forming tool 26 is mounted.

The basic molding die 24 has an extrusion opening 28 (see FIG. 12) for extruding both the anchor portion 8 and the tubular sealing portion 10 of the door seal 2. On the front end of the basic molding die 24, a pair of guide blocks 30 have been fixed by the bolts 32, and the groove forming tool 26 can move in the direction orthogonal to the extrusion direction of the door seal 2 while being guided by a pair of guide blocks 30.

On the tip of the groove forming tool 26, a penetration portion 26a with a width corresponding to the width of the insertion groove 20 to be formed in the anchor portion 8 of the door seal 2 is provided. On the rear end of the groove forming tool 26, a drive rod 34 is fitted, and the groove forming tool 26 is moved by the drive rod 34 in the direction orthogonal to the extrusion direction of the door seal 2 while being guided by a pair of guide blocks 30, so as to go into the anchor portion 8 or leave it.

Figure 9:
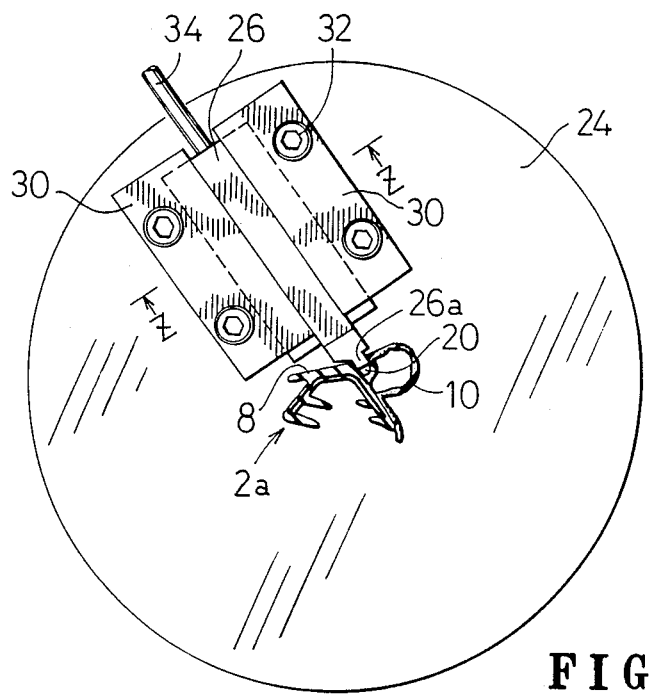
Figure 12:
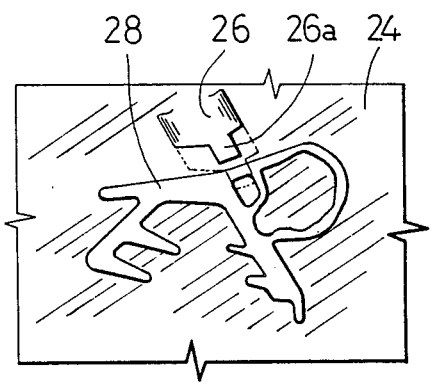

As shown by a two-dot-dash line in FIGS. 9 and 12, under the state that the penetration portion 26a of the groove forming tool has entered the anchor portion 8 of the door seal 2, the extrusion opening 28 provided in the basic molding die 24 is partially blocked, to form the insertion groove 20 in the anchor portion 8.

Figure 10:
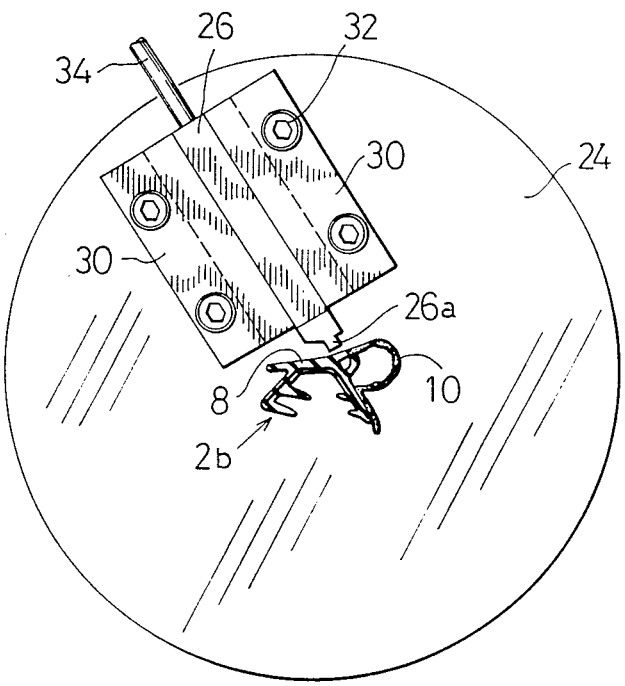
Figure 11:
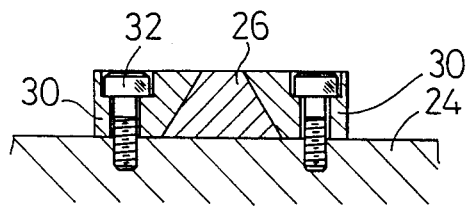

In addition, as shown by a solid line in FIGS. 10 and 12, under the state that the penetration portion 26a of the groove forming tool 26 has left the anchor portion 8, the extrusion opening is not blocked any more, and the insertion groove 20 is not formed in the anchor portion 8.

Figure 13:
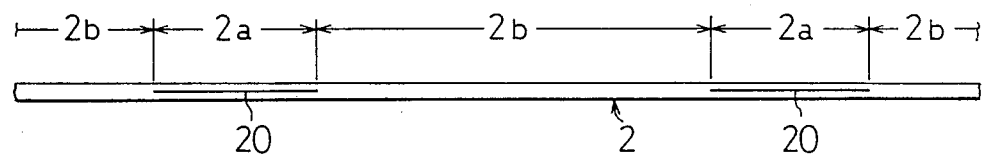

Therefore, when the penetration portion 26a of the groove forming tool 26 is caused to go into and leave the anchor portion 8 of the door seal 2 being continuously extruded from the basic molding die 24, the insertion groove 20 is intermittently provided in the anchor portion 8, to alternately form the first door-sealing member 2a and the second door-sealing member 2b, as shown in FIG. 13.

If a ratio of the time required for causing the penetration portion 26a of the groove forming tool 26 to enter the anchor portion 8 to the time required for separating the penetration portion 26a from the anchor portion 8 is set to be a ratio of the length of the first door-sealing member 2a to that of the second door-sealing member 2b, the intended door seal 2 can be continuously extruded and molded.

In this way, the door seal 2 can be obtained by integrally the first door-sealing member 2a having the insertion groove formed in the anchor portion 8 and the second door-sealing member 2b not having it in the anchor portion 8, without any joint therebetween.

Figure 14:
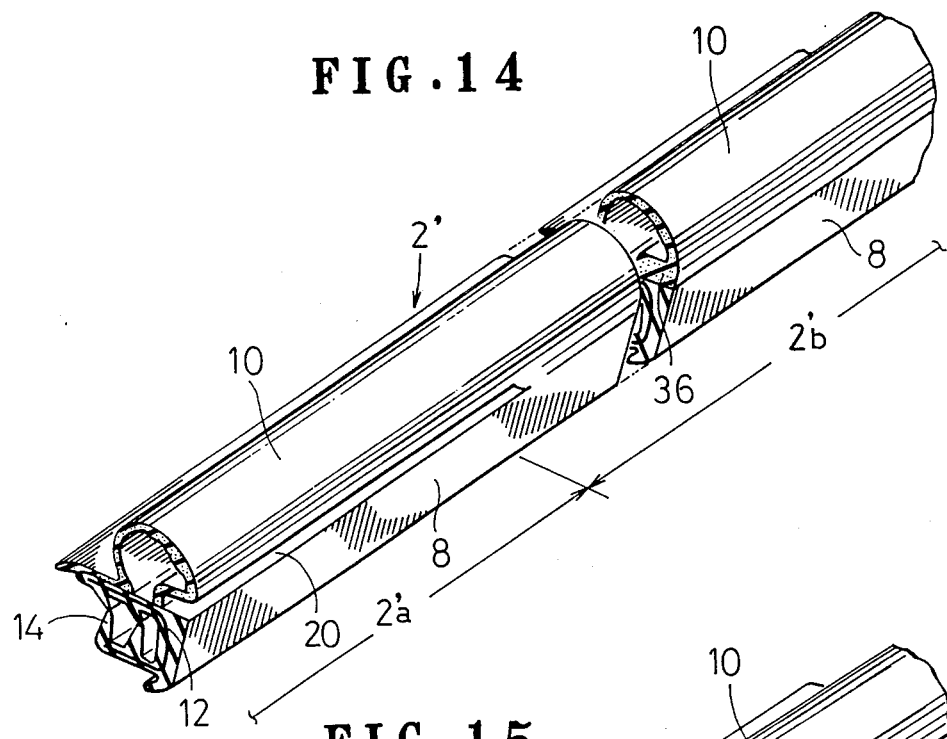
Figure 15:
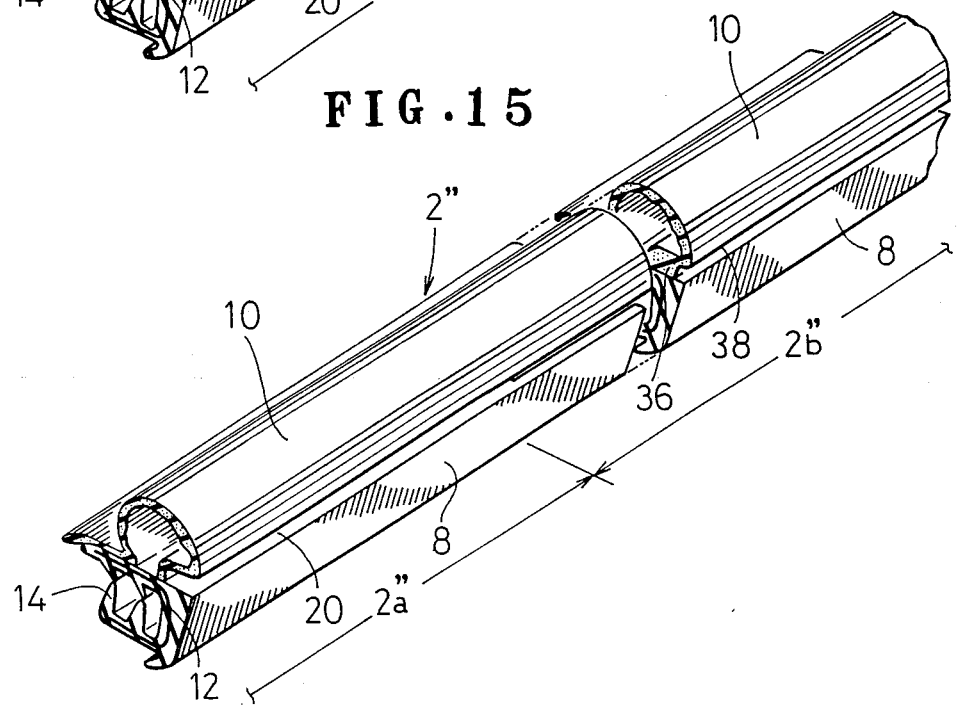
Figure 16:
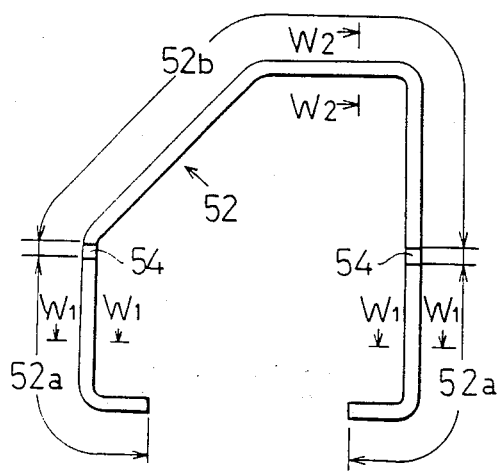
FIGS. 16 to 18 are drawings for illustrating the conventional door seal 52.
Figures 17, 18:
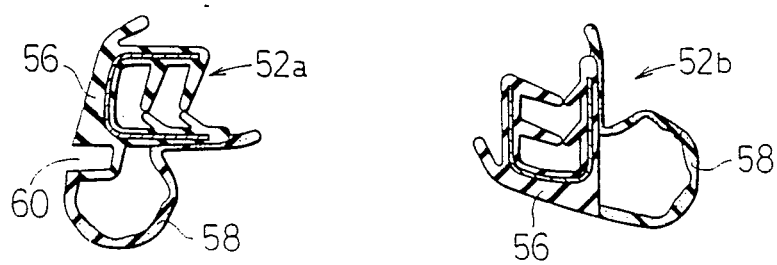

FIGS. 14 and 15 show another automobile door seals 2' and 2" of the present invention.

The second door-sealing member 2'b of the door seal 2' has a solid portion 36 as an elasticity resistance, to suppress the free elastic deformation of the tubular seal portion, and the first door-sealing member 2'a has the insertion groove 20 formed in the portion corresponding to the solid portion 36 of the second door-sealing member 2'b. Besides, if a shallow groove 38 is provided in the solid portion 36 as with the door seal 2", the elasticity resistance of the tubular seal portion 10 can be delicately adjusted. Thus, the tubular seal portion 10 can be deformed so as to achieve the highest sealing effect when the door is closed.

We claim:

1. An automobile door seal, which consists of an anchor portion to be attached to the frame of the automobile body and a tubular seal portion integrally connected with said anchor portion and achieving sealing by elastic deformation, said seal being capable of being attached along the peripheral edge of a door opening of the automobile body, said seal having a first door-sealing portion having therealong an insertion groove extending in the direction of the length of said door seal and adjacent the integral connection of said anchor portion and said tubular seal portion and being for receiving the edge of a facing member on the interior of the automobile body, and said door seal having a second door-sealing portion which is ungrooved, said door sealing portions being integrally molded to each other for avoiding the presence of a joint between them.

2. An automobile door seal as claimed in claim 1 in which said insertion groove is in said anchor portion of said first door-sealing portion.

3. An automobile door seal as claimed in claim 1 in which said tubular portion of said second door-sealing portion has a portion of the cross-section thereof lying along said anchor section with a substantially greater thickness than the cross-sectional thickness of the remainder of the tubular portion for reducing the elasticity of said tubular portion in the area of said substantially greater thickness.

4. An automobile door seal as claimed in claim 3 in which a part of said tubular portion of said first door-sealing portion is spaced from said anchor portion of said first door-sealing portion to define said insertion groove.

* * * * *